United States Patent [19]

Johnson

[11] 3,772,469

[45] Nov. 13, 1973

[54] FAST WIND TAPE TRANSPORT WITH TENSION CONTROL

[75] Inventor: Delmar R. Johnson, Barrington, Ill.

[73] Assignee: Ampex Corporation, Redwood City, Calif.

[22] Filed: Dec. 10, 1971

[21] Appl. No.: 206,754

[52] U.S. Cl. .......... 179/100.2 T, 242/206, 242/208, 242/209, 274/4 D

[51] Int. Cl.. G11b 15/44, G11b 15/48, G11b 15/43

[58] Field of Search .............. 179/100.2 T, 100.2 S; 274/4 D; 242/209, 206, 208

[56] References Cited

UNITED STATES PATENTS

| | | | |
|---|---|---|---|
| 3,125,644 | 3/1964 | Lyon | 179/100.2 T |
| 3,535,441 | 10/1970 | Grace | 179/100.2 T |
| 3,626,115 | 12/1971 | Watanabe | 179/100.2 T |
| 3,488,453 | 1/1970 | Chupity et al. | 179/100.2 T |

*Primary Examiner*—Bernard Konick
*Assistant Examiner*—Robert S. Tupper
*Attorney*—William E. Anderson et al.

[57] ABSTRACT

A controlled acceleration and a reduction in inertia and drag forces on a magnetic tape are achieved in a recording and/or reproducing apparatus during a fast wind operation by driving a capstan which is frictionally coupled to the tape. This is of particular value in an apparatus in which the capstan can not be readily decoupled from the tape. The capstan is driven at the slower velocity for recording or reproducing on the magnetic tape by a first drive means and the capstan is driven by a second drive means at a faster velocity for fast wind of the tape. Preferably, the second capstan drive means for the fast wind operation comprises a printed circuit motor having its rotor directly attached to the capstan; and means are provided for decoupling another motor for the first capstan drive means from driving relationship with the capstan during the fast wind drive of the tape. A servo means may be employed for controlling the supply reel drive means and the take-up reel drive means to limit the winding tensiyn in the coil of tape during a fast wind transport thereof.

9 Claims, 3 Drawing Figures

FAST WIND TAPE TRANSPORT WITH TENSION CONTROL

This invention relates to a magnetic tape recording and/or reproducing apparatus and more particularly to a tape transport system for use therein.

Tape transports for magnetic tape recording and/or reproducing apparatus generally include a supply reel for receiving a relatively large coil of tape which is threaded past recording or reproduce heads to a take-up reel. The magnetic tape is driven by a capstan drive including a rotatable capstan past the recording or reproduce heads at a very precise and controlled velocity, for example, 9.6 inches per second, and the supply of tape often is sufficiently large to last for one hour of tape transport at this operational velocity. When it is desired to transport the magnetic tape at a faster velocity, for example, 200 inches per second, as during a fast wind in either the forward or reverse directions, a substantially initial force is exerted on the magnetic tape by one of the reels pulling the tape past the recording and reproducing heads, through the various tape guides, about the capstan and onto its reel.

Such an initial pulling force on the magnetic tape results in a high peak stress in the tape and taut initial windings therefrom on the pack of tape on the reel where the tape path involves substantial fixed guide wrap and a capstan having a substantial tape wrap. During the acceleration of the magnetic tape for a fast wind operation, the tension in the tape increases substantially, e.g., 80 ounces of force, which is many times higher than the usual take-up tension of 10 ounces when operating at the slower recording and reproducing speed. As a result, the tape windings in the tape pack are significantly tighter for the length of tape accelerated for the fast wind than the windings from a length of tape wound at the operational speed and with only 10 ounces of take-up tension. On the other hand, once the magnetic tape is accelerated to the fast wind speed of 200 inches per second, air bearings develop about the tape guides, the tape drive capstan and the recording and reproducing heads; and, at this time, with the inertia and static friction overcome and with the formation of air bearings, the take-up tension falls to an undesirable low value, e.g., five ounces. Manifestly, the tautness or looseness of the tape windings in the tape pack will vary considerably if windings are first made at the 10 ounce take-up tension, then the tape is subjected to an 80 ounce tension during a fast wind tape acceleration, and then the take-up tension is relaxed to several ounces of tension at the fast wind speed. The 80 ounce tension is great enough to cause some permanent elongation in the tape and the five ounce tension is too low to provide an adequate tape pack at fast wind speed where there is a tendency for air entrapment between tape layers. Also, even when the initial winding tape tension is as high as 80 ounces because of the inertia of the capstan and the high tape path friction, the tape acceleration is not as fast as desired.

Accordingly, a general object of the invention is to provide a new and improved tape transport system for providing improved tape handling during a fast wind operation of a magnetic tape transport.

Other objects and advantages of the invention will become apparent from the ollowing detailed description taken in connection with the accompanying drawings in which.

Figure 1:
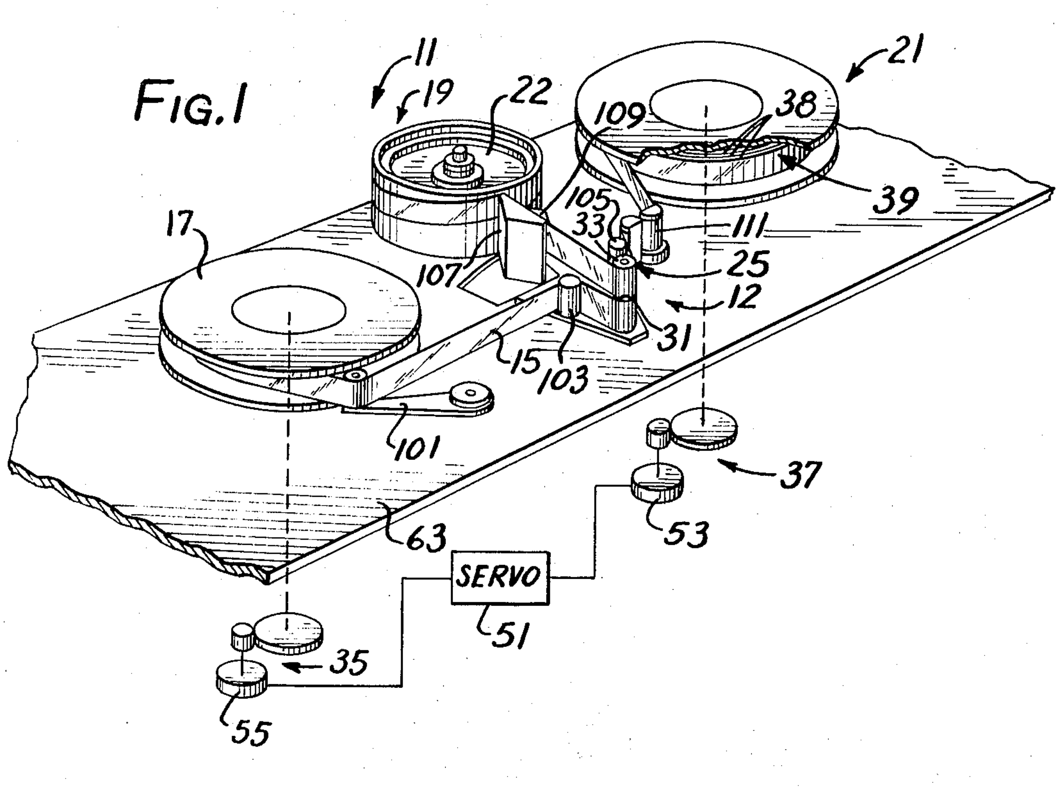
FIG. 1 is a diagrammatic perspective view of a magnetic tape recording and/or reproducing apparatus in which the present invention may be employed.

As shown in the drawings for purposes of illustration, the invention is embodied in a magnetic tape recording and reproducing apparatus 11 having a tape transport 12 for transporting a magnetic tape 15 between a tape supply means in the form of a supply reel 17 for travel past a transducer means 19 to a take-up means comprising a take-up reel 21. In this instance, the transducer means 19 comprises a scanning assembly including a rotatable scanning drum 22 about which the magnetic tape 15 is helically wrapped for contact with a transducer head (not shown) carried by the drum to record on or reproduce from the tape. The magnetic tape 15 is transported about the scanning drum by a rotatable capstan 25 which has a friction surface 27 with a high coefficient of friction. The capstan is driven by a motor drive means 28 comprising a transmission 29 and a capstan drive motor 30 to transport the magnetic tape about the scanning drum. During fast wind operation, the capstan drive motor 30 was decoupled.

The apparatus 11 illustrated in FIG. 1 is a conventional video tape recorder in which the magnetic tape 15 is looped about the scanning drum 22 from the capstan 25. More specifically, the loop is formed with the magnetic tape extending to and around the scanning drum 22 for return to a wrap about an upper portion 33 of the capstan 25. The closed loop isolates the magnetic tape at the transducing drum from stretching due to tension disturbance forces emanating from the supply reel 17 or the take-up reel 21. Additionally, the tape is wrapped about a series of tape guides which exert friction retarding forces on tape which must be overcome when a fast wind operation is commenced. It has been observed that on the initiation of a fast wind of the magnetic tape against the drag in the system the tension in the tape may rise to 80 ounces compared to the usual 10 ounces of tension when the magnetic tape is being wound at the operational speed on the take-up reel 21. The static frictional retarding forces and the inertia forces acting on the tape cause this peak tension in the tape, result in a generally sluggish and rough initial acceleration of the magnetic tape to the fast wind velocity, which is, in this instance, an average velocity of 200 i.p.s. This high tension may cause the tape to permanently elongate and causes wear and tear thereon. Additionally, tape windings 38 in a tape pack 39 made during this peak period of high tension are considerably more taut than any windings made earlier at the 10 ounce tension. Also, when the magnetic tape accelerates and reaches the fast wind velocity, the inertia is overcome and air bearings are developed between the tape 15 and the scanning drum 22, tape guides and capstan 25. The air bearings reduce the friction forces and, in this case, the tension may drop to only several ounces at the take-up reel pack 39 and the windings 38 therein are loose compared to the windings 38 made at the 10 ounce tension or higher tensions. Such variations in the tape pack winding tension are the subsequent cause of a poor tape pack and tape stored in this condition may be permanently damaged. Thus, it is most desirable to eliminate such variations in winding tension caused by a fast wind of the magnetic tape.

Figures 2, 3:
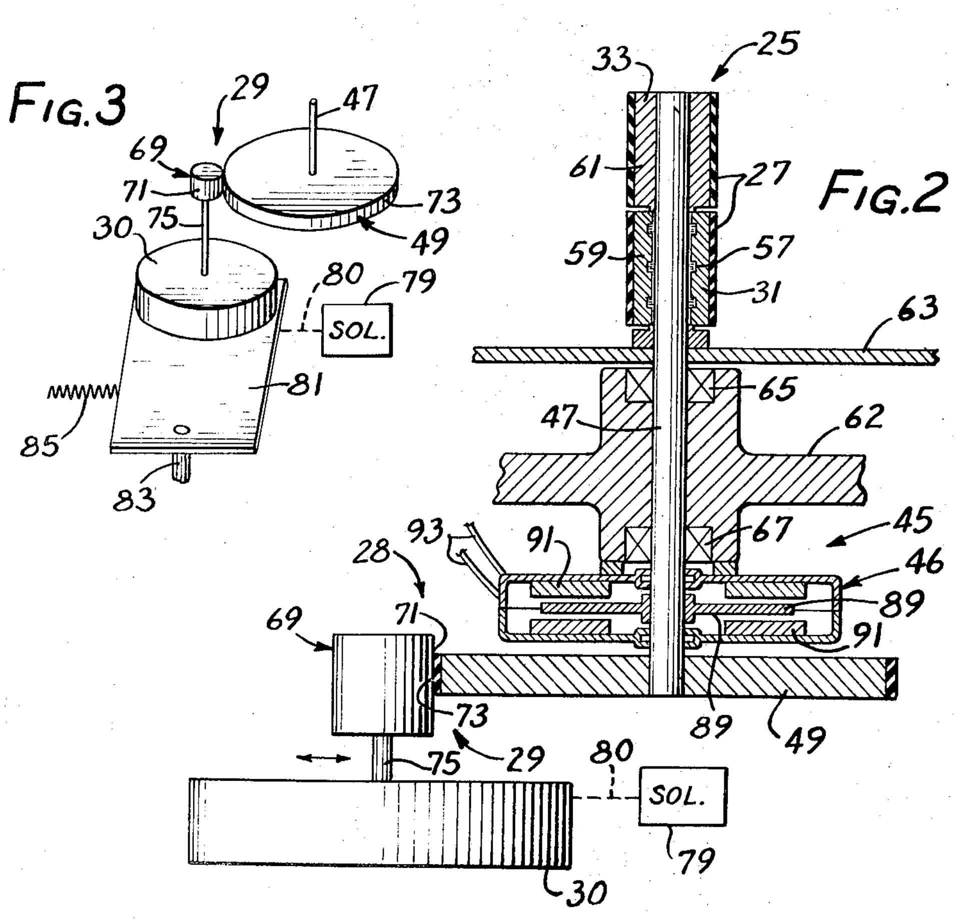
FIG. 2 is a cross-sectional view of a motor drive for the capstan shown in FIG. 1.
FIG. 3 is a diagrammatic illustration of means to decouple a first capstan drive motor from the capstan.

In accordance with the present invention, the magnetic tape 15 is provided with a more controlled acceleration and with a reduction in inertia and drag forces to be overcome with the result that the take-up tension and the windings throughout the tape pack 39 are more uniform. Additionally, the peak stress applied to the tape has been reduced from that heretofore experienced with the apparatus 11. To these ends the tape capstan 25 is driven by another capstan drive means 45 operable at higher speed during fast wind modes. Thus, during fast wind, the capstan is employed to accelerate the tape by exerting a positive forward transporting force on the tape at the capstan 25. More specifically, a second capstan drive motor 46 (FIG. 2) is energized to rotate a capstan support drive 47 and a flywheel 49 attached thereto at a higher rate of speed than is possible with the first capstan drive motor 28 and its transmission 29.

Moreover, in accordance with another aspect of the invention, a servo means 51 is provided to limit the maximum and minimum torques applied by the supply motor drive means 35 and the take-up motor drive means 37 to limit the take-up tension within a range close to the 10 ounces of take-up tension experienced at operational speed winding of magnetic tape on the take-up reel 21. As will be explained, the servo means 51 monitors changes in voltage and current across a take-up driving motor 53 due to changes in torque occurring as the radius of the pack of tape on the take-up reel 21 increases and controls the speed of a supply reel motor 55.

Referring now in greater detail to the capstan 25 and the preferred manner of driving the magnetic tape thereby, the capstan 25 is preferably of the kind disclosed in U.S. Pat. No. 3,612,376 having a lower portion 31 receiving the magnetic tape from the tape supply reel 17 with the magnetic tape wrapped with a large angular wrap about the outer frictional surface 27 prior to traveling to the scanning assembly drum 22. The friction surface 27 of the capstan is usually an elastomeric surface, for example, a cast polyurethane which has a high coefficient of friction as contrasted to a polished steel surface for a capstan. The lower portion of the capstan is separated from the upper portion and includes a viscous fluid 57 between the shaft 47 and a lower sleeve 59 carrying the friction surface 27. The upper frictional surface 27 is secured to an upper sleeve 61 fastened directly to the capstan shaft 47. The viscous coupling assists in isolating the closed loop of tape about the scanning drum 22 from tension fluctuations in the supply tape without attenuating the tape. The capstan shaft 47 is mounted for rotation about its longitudinal axis in a support casting or plate 62, which is located underneath a deck plate 63, in an upper bearing 65 and a lower bearing 67 carried by the support plate 62.

When the capstan 25 and the capstan shaft 47 are driven at the operational velocity for a playback or recording operation, the drive is through the transmission 29 which comprises a driving wheel 69 having an outer cylindrical surface 71 for driving engagement with a rubber tire 73 on the circumference of the flywheel 49. The drive wheel 69 is connected to and driven by an output shaft 75 for the capstan drive motor 30 and the speed of the latter is carefully controlled to provide the desired angular rotation of the capstan to achieve the constant velocity of 9.6 i.p.s. in this instance.

The slower speed motor 30 is coupled to the capstan during play or record operation by means in the form of a solenoid 79 which is energized to shift the driving wheel 69 into driving engagement with the flywheel 49. The faster second capstan drive means 45 is used to accelerate the magnetic tape 15 to a speed faster than 9.6 i.p.s. for fast wind operation. This may be accomplished, as shown diagrammatically in FIG. 3, by energizing the solenoid 79 to pull in its plunger 80 pivotally connected to a motor support plate 81 to pivot it about a pivot post 83 in a direction against the urging of a spring 85. With de-energization of the solenoid 79 as, for example, at the termination of play or record operation, the spring 85 will swing the motor mounting plate 81 so as to disengage the driving wheel 69 from the tire 73 of the flywheel 49.

The fast capstan drive means 45 is automatically coupled or decoupled from the capstan 25 with energization of its motor 46 which is a printed circuit motor, in this instance, having a rotatable rotor 89 fastened to the lower end of the capstan shaft 47. A flat, thin stator 91 for the printed circuit motor 87 is secured to the underside of the support plate 62 and above the flywheel 49 in this instance. The stator 91 is connected by suitable electric leads 93 to a control circuit operable with operation of a fast wind selector (not shown).

Thus, in accordance with the present invention, a fast wind operation is begun with energization of the fast wind drive motor 46 to turn its rotor 89 and attached capstan shaft 47; and because of the large angular wraps of the magnetic tape 15 about the lower and upper portions 31 and 33 of the capstan and its high coefficient of friction surface 27, the tape will be accelerated without slipping between the tape and capstan. The motor 46 may drive the capstan 25 to transport the tape with a velocity which averages about 200 i.p.s. which is the nominal average tape velocity for fast wind for the embodiment of the invention described herein.

Simultaneously with the operation of the second capstan drive motor 46 to turn the capstan 25, the take-up motor 53 and the supply drive means motor 55 are energized to drive their respective reels. As stated above, accelerating the magnetic tape 15 by the capstan 25 reduces the peak forces applied to the tape and results in a smoother and more snappy fast wind of the tape onto a reel with a more uniform tension than experienced without such a driving of the capstan during a fast wind operation.

However, it was still found that the take-up tension at the take-up reel 21 is initially higher than the 10 ounces before the air bearings develop. To further reduce and to limit the range of take-up tension during fast wind, the servo system or means 51 may be added to control the speeds and the torques of the supply drive motor 55 and the take-up drive motor 53. In this instance, the voltage drop across the take-up motor 53 is monitored during acceleration of the magnetic tape. During this acceleration, when the torque at the take-up reel motor 53 is increasing to overcome the inertia and frictional resistance in the system, the take-up motor voltage will be dropping. The servo means 51 then increases the voltage to the supply drive reel motor 55 in a manner that reduces the hold back torque to assist in reducing the tension in the magnetic tape 15 being accelerated by the capstan 25. As the magnetic tape reaches its average fast wind velocity, the take-up motor current is measured and monitored by the servo means 51 and changes in current are used to adjust the rotational rate of the supply reel drive motor 55. As air bearings are formed about the capstan 25, the scanning drum 22 and the respective tape guides, the change in current at the take-up motor 53 is used to drop the supply motor's voltage and speed thereby increasing the tension in the magnetic tape. The speed of the capstan 25 need not be changed by the servo means 51 as the air bearings between its elastomeric friction surface 27 and the magnetic tape 15 prevents the capstan from exerting substantial forces on the tape after it has been accelerated to the nominal fast wind velocity.

For purposes of illustration only, the tape guides used with an Omega helical wrap about the scanning assembly drum 22, will now be described. It is to be appreciated that this particular apparatus 11 is by way of example; and also that other tape paths may be employed with the present invention to drive the capstan 25 during the fast wind.

The length of magnetic tape 15 drawn from the supply reel 17 passes about a pivotally mounted tension arm 101 and then about a cylindrical entrance guide 103 having an axis parallel to the axis of the capstan 25. A similar exit guide 105 is mounted with its axis parallel to the entrance guide 103 and both the gudies are mounted on the deck 63 between the capstan 25 and the scanning assembly drum 22 on the opposite sides of a line extending between the vertical axis for the capstan 25 and for the drum 22. In addition, a pair of retractable tape guides 107 and 109 are slidably mounted on the deck 63 on opposite sides of a line between the axes of the capstan 25 and scanning assembly drum 22 at a location between the entrance and exit guides 103 and 105 and scanning drum 22.

As shown in FIG. 1, the magnetic tape 15 leaving the tape tension arm 101 extends about the entrance guide 103, extends around the lower portion 31 of the capstan 25, about a downwardly tapered lower half of the right hand retractable entrance guide 109, and tangentially upon a lower stationary portion of the scanning assembly drum 22. By virtue of the shape of the entrance guide 109, the magnetic tape is twisted slightly to slant the lower half outwardly from the line between the capstan and drum axes. This twist causes the tape entering the scanning assembly to traverse in an upward path as it extends approximately 360° around the drum 22 to the retractable exit guide 107. The magnetic tape thus extends in a helical wrap around the scanning assembly drum 22 with the taper of the entrance guide 109 selected to impart a pitch to the wrap which positions substantially the entire width of the magnetic tape over the upper rotating portion of the scanning drum at a point adjacent the left hand or exit guide 107.

The tape tangentially leaves the scanning assembly drum 22 at the exit guide 107 which has a tapered upper half and then around the upper portion 33 of the capstan 25 to the fixed exit guide 105 for travel to the take-up reel 21. The tapered upper half of the exit guide 107 is equal, but opposite to that of the entrance guide 109 such that the tape 15 is twisted to slant the upper edge thereof outwardly from a line between the drum and capstan axes by an amount equal to the outward slant of the lower edge arising from the original twist effecting the helical wrap. Thus, the exiting tape is returned to a path lying in a plane parallel to the deck 63 before it reaches the upper portion 33 of the capstan 25 with the result that the magnetic tape extends uniformly about the capstan and onto the take-up reel without kinking or twisting. A tape timer 111 may be disposed between the capstan 25 and the take-up reel 21.

As an aid to understanding the invention, a brief review of the operation of the illustrated apparatus will be given. During normal recording or reproducing operations, the capstan 25 is driven at a first angular rate by the first capstan drive means 28 comprising the motor 30 with the supply reel motor 55 and the take-up reel motor 53 also operated to transport the magnetic tape onto the take-up reel 21. The supply reel 17 may be braked to control the supply tension of the tape to the capstan 25 and hence to control the tape tension in the scanning area. In this instance, a closed tape loop is formed about the scanning drum 22 between a large angular wrap from the supply side at and about a lower portion 31 of the capstan 25, an approximate 360° wrap about the scanning assembly drum 22, and a return to the upper portion 33 of the capstan 25. The magnetic tape extends from the capstan 25 and is wound onto the take-up reel 21 with a substantially constant take-up tension of about 10 ounces with the capstan driving the magnetic tape about the scanning drum at a substantially constant velocity of 9.6 i.p.s. The capstan 25 is driven by the first drive means 28 including the motor 30.

When it is desired to wind the magnetic tape 15 at a fast rate of speed, for example, 200 i.p.s., a suitable fast wind selector (not shown) is operated to decouple the first capstan driving motor 30 from turning the capstan 25 while the motor 46 of the second capstan drive means 45 is operated to turn the capstan 25. The motor has a thin disc shaped rotor 89 secured to and coaxial with the capstan drive shaft 47. More specifically, the solenoid 79 is released to shift the driving wheel 69 from the flywheel 49 to decouple the motor 30 from the capstan 25; and the capstan 25 is accelerated by the motor 46 to exert a controlled acceleration force on the tape while the take-up drive motor 53 is energized to assist in transporting the magnetic tape 15. The result is that the inertia and friction forces are quickly overcome without the tape experiencing as substantial a peak tension force as experienced heretofore. The tape moves in a snappy manner without the rough tape movements or tight initial windings on the tape pack 39 due to high tension and winding forces at the take-up reel 21.

When the magnetic tape 15 is accelerating from a stationary position, the initial take-up tension in the magnetic tape may still increase beyond a desired level, e.g., 17 pounds of tension at the take-up reel 21; and, a servo means 51 may be used to aid in keeping the tension below the limit. More specifically, the voltage applied to the take-up motor 53 may be monitored and when it drops indicating a substantial increase in torque and take-up tension for the magnetic tape 15 during acceleration of the magnetic tape, the servo means 51 may cause an increase in voltage applied to the supply reel motor 55 to reduce the hold back tension in the tape. After the magnetic tape 15 is being wound at the fast wind velocity, air bearings will form about the capstan 25, drum 22 and the various tape guides and the take-up tension will decrease. The electrical current for the take-up motor 53 is monitored by the servo means 51 as indication of load on the motor which is a result of tension in the tape. As the load drops with a tension decrease substantially below 10 ounces, the current change is analyzed by the servo means 51 and the supply reel motor torque is reduced to increase the take-up tension to the nominal 10 ounces.

From the foregoing, it will be seen that the present invention provides a reduction in initial take-up tension in the magnetic tape, the peak stress applied to the magnetic tape and a faster acceleration of the magnetic tape to the nominal fast wind velocity. The result is a more uniform winding of the magnetic tape in the pack and less wear and tear on the tape. The addition of the fast wind drive for the capstan to accelerate the magnetic tape is made simply and without interference with the drive means used to turn the capstan for a recording or reproducing operation. Moreover, a servo system may also be used with the fast wind capstan drive of the magnetic tape to control and provide a more uniform take-up tension during the course of the fast wind operation.

Various changes and modifications may be made in the invention without deviating from the spirit and scope thereof. Various features of the invention are set forth in the accompanying claims.

What is claimed is:

1. A magnetic tape transport for transporting a magnetic tape at a first operational velocity for recording or reproducing and for transporting the tape faster at a second fast wind velocity, said transport controlling tape acceleration to said fast wind velocity and tape take-up tension at said fast wind velocity to provide more uniform windings in a tape coil comprising a tape supply means for carrying a supply of magnetic tape for transport, a take-up reel means having a take-up reel for winding into a coil the tape transported thereto from said supply means, a transducer means for engaging the tape intermediate said tape supply means and said take-up means for recording or reproducing on said magnetic tape, a tape capstan having a friction surface with a high coefficient of friction in frictional engagement with the tape and exerting a driving force to said magnetic tape being transported past said transducer means, tape guide means for wrapping said tape about said capstan with a substantial angular wrap about said friction surface to provide a driving frictional engagement with said capstan for driving said tape without slippage at said operational speed and during initial acceleration of said tape to said fast wind velocity, means for driving said take-up means to exert a pull on said tape to wind the tape on said take-up reel at said operational and fast wind velocities, a first capstan drive means for driving said capstan at the operational velocity for transporting said tape during a reproducing or recording operation with said tape having said driving frictional engagement with said capstan, and a second capstan drive means for driving said capstan to accelerate the tape to said fast wind velocity while in frictional driving contact therewith when said take-up drive means is operated to wind said tape at the fast wind velocity to reduce the stress on the magnetic tape and the winding tension on the magnetic tape at the take-up reel at initiation of a fast wind operation, said tape guide means holding said tape in said frictional driving engagement with said capstan during acceleration to said fast wind speed as air bearings form between said tape and said capstan whereby said capstan no longer exerts substantial driving forces on said tape when traveling at said fast wind velocity.

2. A tape transport in accordance with claim 1 in which said first capstan drive means includes a first motor and a transmission selectively coupled and uncoupled from driving relationship with said capstan, and in which said second drive means includes a second motor for driving said capstan at a faster velocity than said first motor when said transmission decouples the latter from driving relationship with said first motor.

3. A tape transport in accordance with claim 2 in which a drive shaft supports said capstan for rotation about a longitudial axis for said shaft, a rotatable rotor for said second motor is attached to said capstan drive shaft for turning therewith and in which said second motor is coaxially aligned with said drive shaft.

4. A tape transport in accordance with claim 3 in which said transmission comprises a drive wheel driven by said first capstan drive motor and further comprises a driven wheel connected to said capstan drive shaft.

5. A tape transport in accordance with claim 1 in which said supply means comprises a supply tape reel and a supply drive motor for rotating said supply tape reel, a servo means controls the speed of said supply drive motor to limit variations in take-up tension at said take-up reel.

6. A tape transport for a video tape recorder for controlling tape acceleration to a fast wind velocity from an operational velocity and tape take-up tension at said fast wind velocity to provide more uniform windings in a tape coil comprising a supply reel for carrying a coil of magnetic tape, a supply reel drive means for turning said supply reel to pay out magnetic tape from the coil, a scanning assembly comprising a rotatable scanning drum about which the magnetic tape from said supply reel is wrapped and passed for recording or reproducing on said magnetic tape, a tape driving capstan having a lower frictional surface about which the magnetic tape is wrapped prior to traveling to said scanning drum and having an upper frictional surface about which said tape is wrapped after exiting said scanning drum, tape guide means for wrapping said tape about said capstan with a substantial angular wrap about said friction surface to provide a driving frictional engagement with said capstan for driving said tape without slippage at said operational speed and druing initial acceleration of said tape to said fast wind velocity, a take-up means including a take-up reel for exerting a pull on said tape and for winding tape into a pack on said take-up reel, a take-up reel drive means for rotating said take-up reel at a first angular rate for winding tape thereon during a recording or reproducing operation and for rotating said take-up reel at a faster angular rate for winding tape during a fast wind operation, a first capstan drive means having a first motor selectively coupled to said capstan to turn the capstan to transport the magnetic tape at a first velocity to record on or reproduce from said magnetic tape, a second capstan drive means operable mutually exclusively of said first capstan drive means and having a second capstan drive means for driving said capstan to provide a controlled acceleration to said fast wind velocity for the magenetic tape during the initiation of a fast wind operation, said tape guide means holding said tape in frictional driving engagement with said capstan during acceleration to said fast wind speed as air bearings form between said tape and said capstan whereby said capstan no longer exerts substantial driving forces on said tape when traveling at said fast wind velocity and a servo means for controling said supply reel drive means and said take-up reel drive means to limit the winding tension in the coil of tape wound on said tape take-up means during a fast wind transport of the magnetic tape.

7. A tape transport in accordance with claim 6 in which said capstan includes a shaft, a printed circuit motor is disposed coaxial with said shaft, and in which a rotor for said printed circuit motor is attached to said shaft to turn therewith when driven by either said first or second capstan drive motors.

8. A magnetic tape transport for transporting a magnetic tape at a first operational velocity during recording or reproducing and for transporting the magentic tape at a second and faster fast wind velocity, said transport controlling tape acceleration to said fast wind velocity and tape take-up tension at said fast wind velocity to provide more uniform windings in a tape coil comprising a tape supply reel for carrying a supply of magnetic tape for transport therefrom and for winding thereon, a take-up means having a take-up reel for exerting a pulling force on said tape and for winding into a coil tape transported thereto from said tape supply reel, a transducer means for engaging the tape intermediate said tape supply reel and said take-up reel for recording or reproducing on said magnetic tape, a tape capstan having a friction surface with a high coefficient of friction in frictional engagement with the tape and exerting a driving force on said magnetic tape being transported past said transducer means, tape guide means for wrapping said tape about said capstan with a substantial angular wrap with said friction surface to provide driving frictional engagement with said capstan for driving said tape without slippage at said operational speed and during initial acceleration of said tape to said fast wind velocity, means for rotating said supply reel and for rotating said take-up reel for winding magnetic tape at said first or second velocities, a first capstan drive means for driving said capstan at the operational velocity for transporting said tape during a reproducing or recording operation with said tape having driving frictional engagement with said capstan, and a second capstan drive means for driving said capstan to accelerate the tape in contact therewith toward said second velocity to reduce the stress on the tape and tension in the tape at initiation of an operation to wind the tape at the faster second velocity, said tape guide means holding said tape in said frictional driving engagement with said capstan during acceleration to said fast wind speed as air bearings form between said tape and said capstan whereby said capstan no longer exerts substantial driving forces on said tape when traveling at said fast wind velocity.

9. A tape transport in accordance with claim 8 in which means including a solenoid is operated to decouple said first capstan drive means from driving relationship with said capstan while said second capstan drive means is accelerateing said magnetic tape.

* * * * *